(12) United States Patent
Harding et al.

(10) Patent No.: US 8,045,819 B1
(45) Date of Patent: Oct. 25, 2011

(54) EFFICIENT IMPLEMENTATION OF MIRROR-MODE EDGE HANDLING IN IMAGE FILTERING

(75) Inventors: Aidan Harding, Princes Risborough (GB); Dominic James Nancekievill, West Wycombe (GB)

(73) Assignee: Altera Corporation, San Jose, CA (US)

( * ) Notice: Subject to any disclaimer, the term of this patent is extended or adjusted under 35 U.S.C. 154(b) by 1027 days.

(21) Appl. No.: 11/981,906

(22) Filed: Nov. 1, 2007

(51) Int. Cl.
*G06K 9/40* (2006.01)
*G06K 9/48* (2006.01)

(52) U.S. Cl. ........................ 382/260; 382/199
(58) Field of Classification Search .................. 382/260, 382/262, 263, 266, 199
See application file for complete search history.

(56) References Cited

U.S. PATENT DOCUMENTS

| | | | |
|---|---|---|---|
| 6,999,100 B1* | 2/2006 | Leather et al. | 345/611 |
| 7,046,399 B2* | 5/2006 | Endo | 358/3.26 |
| 7,259,796 B2* | 8/2007 | Sha et al. | 348/581 |
| 2007/0152991 A1* | 7/2007 | Callway | 345/204 |
| 2008/0095236 A1* | 4/2008 | Kim et al. | 375/240.13 |

* cited by examiner

*Primary Examiner* — Yon Couso
(74) *Attorney, Agent, or Firm* — Mauriel Kapouytian & Treffert LLP; Ararat Kapouytian

(57) ABSTRACT

A method of filtering image data is described. In one embodiment, the method includes storing in line buffers image data corresponding to a plurality of rows of an image; filtering image data on one row of multiple of rows; and filtering image data on another row of the multiple rows without changing the image data stored in the line buffers between filtering image data on the one row and filtering image data on the another row.

17 Claims, 5 Drawing Sheets

FIG. 2 (Prior Art)

| $i_0,j_1$ | $i_1,j_1$ | $i_2,j_1$ | $i_3,j_1$ | $i_4,j_1$ | $i_5,j_1$ |
|---|---|---|---|---|---|
| $i_0,j_0$ | $i_1,j_0$ | $i_2,j_0$ | $i_3,j_0$ | $i_4,j_0$ | $i_5,j_0$ |
| $i_0,j_0$ | $i_1,j_0$ | $i_2,j_0$ | $i_3,j_0$ | $i_4,j_0$ | $i_5,j_0$ |
| $i_0,j_1$ | $i_1,j_1$ | $i_2,j_1$ | $i_3,j_1$ | $i_4,j_1$ | $i_5,j_1$ |
| $i_0,j_2$ | $i_1,j_2$ | $i_2,j_2$ | $i_3,j_2$ | $i_4,j_2$ | $i_5,j_2$ |
| $i_0,j_3$ | $i_1,j_3$ | $i_2,j_3$ | $i_3,j_3$ | $i_4,j_3$ | $i_5,j_3$ |
| $C_0$ $i_0,j_4$ | $i_1,j_4$ | $i_2,j_4$ | $i_3,j_4$ | $i_4,j_4$ | $i_5,j_4$ |
| $C_1$ $i_0,j_5$ | $i_1,j_5$ | $i_2,j_5$ | $i_3,j_5$ | $i_4,j_5$ | $i_5,j_5$ |
| $C_2$ $i_0,j_6$ | $i_1,j_6$ | $i_2,j_6$ | $i_3,j_6$ | $i_4,j_6$ | $i_5,j_6$ |
| $C_3$ $i_0,j_6$ | $i_1,j_6$ | $i_2,j_6$ | $i_3,j_6$ | $i_4,j_4$ | $i_5,j_6$ |
| $C_4$ $i_0,j_5$ | $i_1,j_5$ | $i_2,j_5$ | $i_3,j_5$ | $i_4,j_5$ | $i_5,j_5$ |

FIG. 3

EFFICIENT IMPLEMENTATION OF MIRROR-MODE EDGE HANDLING IN IMAGE FILTERING

BACKGROUND

The present invention relates to image filtering. More specifically, it relates to mirror-mode edge handling in image filtering.

Filtering image data typically involves applying a filter thereto. FIG. 1 illustrates the conceptual application of a filter to image data. In FIG. 1, image data 105 (which may also herein be referred to as image 105 or image frame 105) has a filter 110 applied thereto. Image data 105 represents an image frame and includes five rows and six columns of pixels. The five rows in image data 105 include rows $j_0$ to $j_4$. The six columns in image data 105 include columns $i_0$ to $i_5$. Each pixel in image data 105 is identified by its row and column position. For example, pixel $i_2,j_1$ is the pixel on row $j_1$ at column $i_2$. Filter 110 is a two dimensional filter that includes filtering coefficients $c_0$ to $c_9$, as shown in FIG. 1. Filter 110 may also herein be referred to as a kernel window.

Filtering the image data involves filtering each pixel of the image data by the filter. The filtering typically begins on the first row of the image data, e.g., on row $j_0$ of image data 105. More specifically, the filtering typically begins on the pixel on the first column of the first row, e.g., $i_0,j_0$, and proceeds in raster order to the other columns, i.e., from left to right, on that row. Thereafter the filtering proceeds to the next row, e.g., row $j_1$, whose pixels are also processed from left to right. This continues until all the rows of the image data are filtered.

Filtering a pixel of an image data typically involves conceptually centering the kernel window around the pixel and applying filtering coefficients of the filter to the respective pixels over which they are positioned. For example, in FIG. 1, filter 110 is centered around pixel $i_2,j_2$, at which position it filters pixel $i_2,j_2$ of image data 105. The result of filtering pixel $i_2,j_2$ by filter 110 is $(i_1j_1)\times c_0+(i_2j_1)\times c_1+(i_3j_1)\times c_2+(i_1j_2)\times c_3+(i_2j_2)\times c_4+(i_3j_2)\times c_5+(i_1j_3)\times c_6+(i_2j_3)\times c_7+(i_3j_3)\times c_8$. After filtering pixel $i_2,j_2$, filter 110 would be applied to pixel $i_3,j_2$ and the result of the filtering would be $(i_2j_1)\times c_0 \ (i_3j_1)\times c_1+(i_4j_1)\times c_2+(i_2j_2)\times c_3+(i_3j_2)\times c_4+(i_4j_2)\times c_5+(i_2j_3)\times c_6+(i_3j_3)\times c_7+(i_4j_3)\times c_8$.

It is to be noted that the resulting sum for filtering a pixel data typically need not be averaged as such averaging factor is typically already taken into account in the filtering coefficient of the filter, e.g., the $c_0$ to $c_8$ in the example of FIG. 1.

In the situation illustrated in FIG. 1, the kernel window covers only pixels within the image data area, i.e., the kernel window is entirely within the image. However, when filtering pixels at or near the edges or boundaries 106, 107, 108, and 109 of an image data area, part of the kernel window would typically fall outside of the image data area, which may herein be referred to as the filter being off the image data. This would result in a lower filtering value for such pixels, thus producing artifacts around the edges of the filtered image. In order to reduce such artifacts, the pixel data around the edges is mirrored about the edges.

FIG. 2 illustrates filtering of image data using mirroring. In FIG. 2, image data 205 is filtered using filter 210. In FIG. 2, the first row of pixels below horizontal boundary 206 (i.e., pixels in row $j_0$) are mirrored above horizontal boundary 206. Similarly, the first column of pixels to the right of vertical boundary 209 (i.e., pixels in column $i_0$) are mirrored to the left of vertical boundary 209. In fact, not only pixels to the right of vertical boundary 209, but pixels to the right of a line containing vertical boundary 209 are mirrored to the left of such a line. Similarly, the mirroring about boundary 206 is also extended along a line containing boundary 206. In FIG. 2, filter 210 is positioned above image data 205 (and its associated mirrored data) for filtering pixel $i_0,j_0$. The result of such filtering is $(i_0j_0)\times c_0+(i_0j_0)\times c_1+(i_1j_0)\times c_2+(i_0j_0)\times c_3+(i_0j_0)\times c_4+(i_1j_0)\times c_5+(i_0j_1)\times c_6+(i_0j_1)\times c_7+(i_1j_1)\times c_8$.

In FIG. 2, the mirroring applies to only the first row (row $j_0$) and the first column (column $i_0$) because the filter 210 is a 3 by 3 filter which at most would extend one row or column outside the image data area when filtering pixels along boundaries 206 and 209. If a larger filter were used, e.g., a 5 by 5 filter, then the first two rows (i.e., rows $j_0$ and $j_1$) would be mirrored about horizontal boundary 206 and the first two columns (i.e., columns $i_0$ and $i_1$) would be mirrored about vertical boundary 209.

In filtering image data, line buffers are typically used to store image data. Generally, the number of lines (or rows) in the line buffers is equal to the number of rows in the filter used. Thus, for example, if the filter is one such as filter 210 shown in FIG. 2, then three-lines (or three-rows) of line buffers would be used to store image data to be filtered. Each line (or row) of the line buffers would store one row of image data. For example, when filtering pixels in row $j_0$ of image data 205, the first, second, and third lines of the line buffers would be storing data from rows $j_0$, $j_0$, and $j_1$, respectively. When filtering pixels in row $j_1$ of image data 210, the first, second, and third lines of the line buffers would be storing data from rows $j_0$, $j_1$, and $j_2$, respectively. Further, when filtering pixels in row $j_2$ of image data 210, the first, second, and third lines of the line buffers would be storing data from rows $j_1$, $j_2$, and $j_3$, respectively. One way to efficiently manage data in the line buffers as the filtering transitions from row $j_1$ to row $j_2$ is to move data in each line of the line buffers up by one row and to fill the last line with data from a new row, i.e., row $j_3$. This is relatively simple for the row $j_1$ to row $j_2$ transition. However, it can be more complicated for some row transitions where the filter covers mirrored rows above or below horizontal boundaries of the image data, particularly mirrored rows below the lower horizontal boundary, e.g., lower horizontal boundary 208 in FIG. 2.

Thus, there is a need for efficiently managing image data in line buffers, particularly when filtering pixels that involves use of mirrored image data.

SUMMARY

In one aspect, an embodiment of the present invention provides a method of filtering image data. In one embodiment, the method includes storing in line buffers image data corresponding to multiple rows of an image; filtering image data on one row of the multiple rows; and filtering image data on another row of the multiple rows without changing the image data stored in the line buffers between filtering image data on the one row and filtering image data on the another row. In one embodiment, the method further includes determining which row or rows of filtering coefficients in a filter apply to each row of image data stored in the line buffers.

In one embodiment, the method further includes defining filtering coefficients of a filter, where a filtering coefficient c(n) is a filtering coefficient for row n of the filter, where n is an integer that represents a row number of the filter, and c(n) is equal to 0 when n is less than 0 or when n is equal to or greater than N, where N is an integer representing the number of rows in the filter.

In one embodiment, when the filter is x rows below the image, where x is a positive integer, lines 0 to N−1 of the line buffers respectively store data of rows M−N to M−1 of the image, where M is an integer that represents the number of rows of data in the image. In such an embodiment, for each line k of the line buffers, where k is an integer that represents a line number for lines in the line buffers which are numbered from 0 to N−1, filtering coefficients c(k−x)+c(2N−x−1−k) apply.

Also in one embodiment, when the filter is −x rows above the image, where x is a negative integer, line buffers 0 to N−1 respectively store data from rows 0 to N−1 of the image. In such an embodiment, for each line k of the line buffers, filtering coefficients c(k−x)+c(−x−1−k) apply.

BRIEF DESCRIPTION OF THE DRAWINGS

The novel features of the invention are set forth in the appended claims. However, for purpose of explanation, several aspects of particular embodiments of the invention are described by reference to the following figures.

FIG. 2 illustrates filtering of image data using mirroring.

FIG. 3 illustrates the conceptual application of a filter to image data in an embodiment of the present invention.

DETAILED DESCRIPTION

Figure 1:
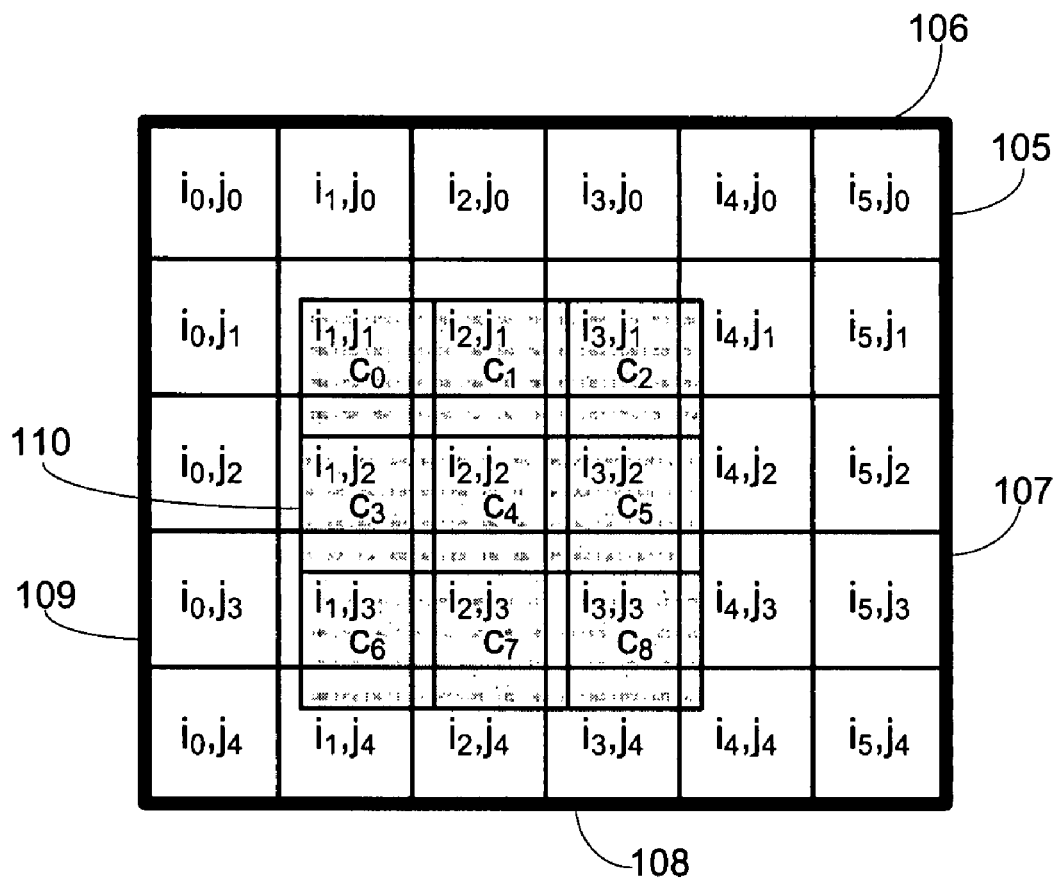
FIG. 1 illustrates the conceptual application of a filter to image data.

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

FIG. 3 illustrates the conceptual application of a filter to image data in an embodiment of the present invention. In FIG. 3, image data 305 is filtered using filter 310. In the embodiment of FIG. 3, filter 310 is illustrated as a one dimensional filter for simplicity. Those skilled in the art, especially with the benefit of the teachings of the present invention, would know how to extend the case to a two dimensional filter. In one embodiment, filter 310 is a finite impulse response (FIR) filter. However, filter 310 is not limited to being a FIR filter and may be any other type of filter that may be represented with a finite number of filtering coefficients.

Filter 310 is a 5-tap filter, in other words it includes 5 rows of filtering coefficients. In filter 310, filtering coefficients $c_0$ to $c_4$ are respectively in rows 0 to 4 of the filter. The filtering coefficients of filter 310 are multiplied by image data to filter the image data. In the position shown in FIG. 3, filter 310 filters data at pixel $i_0 j_6$ and filtering coefficients $c_0$ to $c_4$ are respectively multiplied by pixel data over which they are positioned. The result of the filtering is $(i_0 j_4) \times c_0 + (i_0 j_5) \times c_1 + (i_0 j_6) \times c_2 + (i_0 j_6) \times c_3 + (i_0 j_5) \times c_4$.

It is to be noted that FIG. 3 is a conceptual illustration of image data 305 and filter 310. Those skilled in the art would realize that, in most implementations, filter 310 is not in fact physically placed over image data 305. Instead, the filtering process, e.g., calculation of a filtering result such as that above for pixel $i_0 j_6$, is carried out as if the filter were conceptually placed over the image data as illustrated, such that the filtering coefficients are multiplied with the appropriate pixel image data.

In FIG. 3, the first two rows of pixels below upper horizontal boundary 306 (i.e., pixels in rows $j_0$ and $j_1$) are mirrored above upper horizontal boundary 306. Similarly, the first two rows of pixels above lower horizontal boundary 308 (i.e., pixels in rows $j_5$ and $j_6$, i.e., the last two rows of pixels in image data 305) are mirrored below lower horizontal boundary 308. The number of rows mirrored is a function of the number of rows in filter 310. For example, if filter 310 were to have 7, rather than 5 rows, then 3 rows of image data would be mirrored above and below the upper and horizontal boundaries, respectively.

When a filter is filtering a pixel of an image data such that the filter is entirely within the image data, then rows of image data from rows covered by the filter are stored in line buffers and the data in the line buffers are multiplied by corresponding filtering coefficients. For example, when filtering data on row $j_3$, e.g., pixel $i_0,j_3$, filter 310 would be entirely within image data 305. In such an example, image data from rows $j_1$ to $j_5$ would be stored in the first to the fifth lines of the line buffers. It is to be noted that in one embodiment, the number of lines in the line buffers are equal to the number of rows in the filter. Thereafter, the data in the first to the fifth lines of the line buffers would be respectively multiplied by the filtering coefficients $c_0$ to $c_4$. When filtering data on the following row, i.e., row $j_4$, then filter 310 would still be entirely within image data 305. However, before transitioning to filtering pixels on row $j_4$, the data stored in the line buffers would be changed. Instead of storing data from rows $j_1$ to $j_5$, the first to the fifth lines of the line buffers would be storing data from rows $j_2$ to $j_6$. In one embodiment, the data transition in the line buffers is accomplished by moving data from each of the lines of the line buffers up by one row and then filling the last line of the line buffers with data from the next row, i.e., row $j_6$. Such a transition can be accomplished easily so long as the filter is entirely within the image data. However, as noted above, such a simple transition would not be sufficient when the filter is no longer entirely within the image data.

In one embodiment, the present invention provides an efficient implementation of edge mode mirroring image when the row being filtered is such that the filter is no longer entirely within the image data. In one embodiment, the present invention, not only applies when the filter is not entirely in the image data, but also applies to the transition from the filter being entirely within the image data to not being entirely within the image data. For example, an embodiment of the present invention would apply when transitioning from filtering pixels in row $j_4$ of image data 305 to filtering pixels in row $j_5$ of image data 305.

In one embodiment, the data in the line buffers is unchanged when transitioning from filtering pixels in row $j_4$ to filtering pixels in row $j_5$ of image data 305. In fact, in one embodiment, the data in the line buffers is maintained unchanged from filtering pixels in row $j_4$ through filtering pixels in row $j_6$. In such a case, data from rows $j_2$ to $j_6$ are stored in the first to the fifth line buffers, respectively. This data in the line buffers is maintained constant while filtering pixels from rows $j_4$ to $j_6$ of image data 305. Similarly, when filtering data at the top of image data 305, in one embodiment, data from rows $j_0$ to $j_4$ are respectively stored in the first through the fifth lines of the line buffers and that data is maintained constant while filtering pixels from rows $j_0$ to $j_2$ of image data 305.

This may be generalized as follows. When near the bottom of the image data with M rows of image data (where M is a positive integer), for an N-tap filter (i.e., a filter having N rows of filtering coefficients, where N is an integer and represents the number of taps or rows in the filter), the last N rows of the image data are stored in the line buffers and that data in the line buffers is unchanged when filtering data on the last row where the filter is entirely within the image data to the last row of the image data. Similarly, for an N-tap filter, the first N rows of the image data are stored in the line buffers and that data in the line buffers is unchanged when filtering data on the first row to the first row of the image data where the filter is entirely within the image data.

As noted above, when filter 310 is positioned above image data 305 as shown in FIG. 3, then filtering data for pixel $i_0,j_6$ is determined since the filter is centered about pixel $i_0,j_6$. The result of the filtering is $(i_0j_4) \times c_0 + (i_0j_5) \times c_1 + (i_0j_6) \times c_2 + (i_0j_6) \times c_3 + (i_0j_5) \times c_4$. This result may be rearranged to $(i_0j_4) \times c_0 + (i_0j_5) \times (c_1+c_4) + (i_0j_6) \times (c_2+c_3)$. When filter 310 is positioned above image data 305 such that it is centered about pixel $i_0,j_5$, the result of the filtering is $(i_0j_3) \times c_0 + (i_0j_4) \times c_1 + (i_0j_5) \times c_2 + (i_0j_6) \times c_3 + (i_0j_5) \times c_4$, which can be rearranged to $(i_0j_4) \times c_0 + (i_0j_4) \times c_1 + (i_0j_5) \times (c_2+c_4) + (i_0j_6) \times c_3$. Such rearrangement of the results, where multiple filtering coefficients apply to a row of image data, is possible when mirroring is used and the filter is partially off image. It also allows for implementing an efficient mirror mode edge handling, which is explained in greater detail below.

For an N-tap filter, with filtering coefficients $c_0$ to $c_{N-1}$, the following filtering coefficients are defined: $c(n)=c_n$, when n is less than N and equal to or greater than 0 (i.e., $0 \leq n<N$); and $c(n)=0$, when n less than 0 or equal to or greater than N (i.e., n<0 or $n \geq N$). When the filter is entirely within the image data, then rows of image data are filled into the line buffers as explained above and the data in line buffers 0 to N-1 are respectively multiplied with filtering coefficients $c_0$ to $c_{N-1}$. On the other hand, when the filter is off the bottom of the image data by x rows (where x is a positive integer representing the number of rows by which the filter is off the image data), then the data in line buffer k (where k is an integer that represents the line number of a line in the line buffers and is equal to 0 to N-1 for lines 0 to N-1 of the line buffers) is multiplied by the filtering coefficient(s) $c(k-x)+c(2N-x-1-k)$. As noted above, when the filter is off the bottom of the image data, the last N rows of the image data are stored in the N line buffers. More specifically, rows M-N to M-1 are respectively stored in lines 0 to N-1 of the line buffers, where M is an integer that represents the number of rows of data in the image data and the rows of the image data are numbered from 0 to M-1.

The expression "the filter is off the bottom of the image data by x rows" means that the lower horizontal boundary of the filter is x rows below the lower horizontal boundary of the image data and may also herein be referred to as the filter being x rows below the image data. In the example shown in FIG. 3, filter 310 is 2 rows off the bottom of image data 305 or is 2 rows below image data 305.

When the filter is off the top of the image data by -x rows (where x is a negative integer and the absolute value of x represents the number of rows by which the filter is off the image data), then the data in line buffer k (where k is an integer that represents the line number of a line in the line buffers and is equal to 0 to N-1 for lines 0 to N-1 of the line buffers) is multiplied by the filtering coefficient(s) $c(k-x)+c(-x-1-k)$. As noted above, when the filter is off the top of the image data, the first N rows of the image data are stored in the N line buffers. More specifically, rows 0 to N-1 are respectively stored in lines 0 to N-1 the line buffers.

The expression "the filter is off the top of the image data by -x rows" (where x is a negative integer) means that the upper horizontal boundary of the filter is -x rows above the upper horizontal boundary of the image data and may also herein be referred to as the filter being -x rows above the image data. In the example shown in FIG. 2, filter 210 is 1 row off the top of image data 205 or is 1 row above image data 205.

Figure 2:
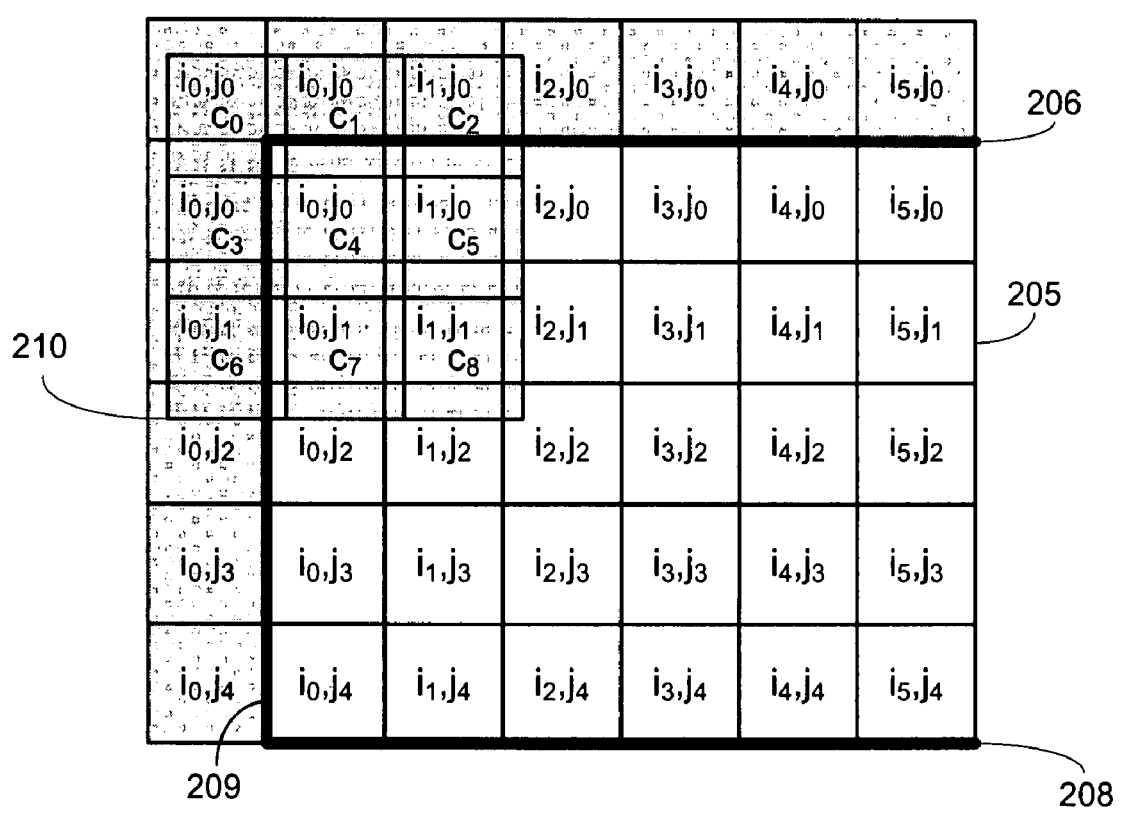

As noted above, FIG. 3 is a conceptual illustration of image data 305 and filter 310. As also noted above, in most implementations, filter 310 is not in fact physically placed over image data 305. Instead, the filtering process is carried out as if the filter were conceptually placed over the image data as illustrated, such that the filtering coefficients are multiplied with the appropriate pixel image data. As such, the expression "the filter is off the bottom of the image data by x rows" may also means that, when filtering data on a row of the image data (e.g., row $j_6$ as illustrated in FIG. 3), filtering coefficients on x rows of the filter are applied to x mirrored rows that are below the bottom of the image data (e.g., as illustrated in FIG. 3, filtering coefficients on rows $c_3$ and $c_4$ are applied to mirrored versions of rows $j_6$ and $j_5$, respectively). Similarly, the expression "the filter is off the top of the image data by -x rows" (where x is a negative integer) may also mean that, when filtering data on a row of the image data (e.g., row $j_0$ as illustrated in FIG. 2), filtering coefficients on -x rows of the filter are applied to -x mirrored rows that are above the top of the image data (e.g., as illustrated in FIG. 2, filtering coefficients on one row of filter 205 (the row containing filtering coefficients $c_0$, $c_1$, and $c_2$) are applied to a mirrored version of row $j_0$).

In one embodiment, the determination as to which filtering coefficient(s) apply to which line buffers, i.e., which filtering coefficient(s) are to be multiplied with image data in which line buffers, is performed during horizontal blanking. It is to be noted that this determination may take multiple clock cycles.

In the example of FIG. 3, M is equal to 7 and N is equal to 5. When filter 310 is off the bottom (i.e., off lower horizontal boundary 308) of image data 305, then data from rows $j_2$ to $j_6$ (i.e., rows M-N to M-1) are respectively stored in lines 0 to 4 (i.e., lines 0 to N-1) of the line buffers. At the position shown in FIG. 3, filter 310 is off image data 305 by two rows, therefore x is equal to 2. For line 0 of the line buffers, i.e., k=0, the following coefficient values are obtained: $c(k-x)+c(2N-x-1-k)=c(0-2)+c(2 \times 5-2-1-0)$, which is $c(-2)+c(7)$. Since for $c(-2)$, n is less than 0, $c(-2)$ is equal to 0. Similarly, since for $c(7)$, n is greater than N, $c(7)$ is also equal to 0. Therefore, the data in line 0 of the line buffers is multiplied by 0. For line 1 of the line buffers, i.e., k=1, the following coefficient values are obtained: $c(k-x)+c(2N-x-1-k)=c(1-2)+c(2 \times 5-2-1-1)$, which is $c(-1)+c(6)$. Since for $c(-1)$, n is less than 0, $c(-1)$ is equal to 0. Similarly, since for $c(6)$, n is greater than N, $c(6)$ is also equal to 0. Therefore, the data in line 1 of the line buffers is multiplied by 0. For line 2 of the line buffers, i.e., k=2, the following coefficient values are obtained: $c(k-x)+c(2N-x-1-k)=c(2-2)+c(2 \times 5-2-1-2)$, which is $c(0)+c(5)$. Since for $c(0)$, n is equal to 0, $c(0)$ is equal to $c_0$. Since for $c(5)$, n is equal to N, $c(5)$ is also equal to 0. Therefore, the data in line 2 of the line buffers is multiplied by $c_0$. For line 3 of the line buffers, i.e., k=3, the following coefficient values are obtained: $c(k-x)+c(2N-x-1-k)=c(3-2)+c(2 \times 5-2-1-3)$, which is $c(1)+c(4)$. Since for $c(1)$, n is greater than or equal to 0 and less than N, $c(1)$ is equal to $c_1$. Since for $c(4)$, n is greater than or equal to 0 and less than N, $c(4)$ is also equal to $c_4$. Therefore, the data in line 3 of the line buffers is multiplied by $c_1$ and $c_4$. For line 4 of the line buffers, i.e., k=4, the following coefficient values are obtained: $c(k-x)+c(2N-x-1-k)=c(4-2)+c(2 \times 5-2-1-4)$, which is c(2)+c(3). Since for c(2), n is greater than or equal to 0 and less than N, c(2) is equal to $c_2$. Since for c(3), n is greater than or equal to 0 and less than N, c(3) is also equal to $c_3$. Therefore, the data in line 4 of the line buffers is multiplied by $c_2$ and $c_3$. Thus, data in line buffer line 2 of the line buffers (i.e., data of row $j_4$ of image data 305) is multiplied by $c_0$, data in line 3 of the line buffers (i.e., data of row $j_5$ of image data 305) is multiplied by $c_1$ and $c_4$, and data in line 4 of the line buffers (i.e., data of row $j_6$ of image data 305) is multiplied by $c_2$ and $c_3$. This is consistent with the rearranged results above (i.e., $(i_0 j_4) \times c_0 + (i_0 j_5) \times (c_1 + c_4) + (i_0 j_6) \times (c_2 + c_3)$) for filtering data at pixel $i_0, j_6$.

Similarly, when filter 310 is off the top (i.e., off upper horizontal boundary 306) of image data 305, then data from rows $j_0$ to $j_4$ (i.e., rows 0 to N−1) are respectively stored in lines 0 to 4 (i.e., lines 0 to N−1) of the line buffers. For filtering data in row $j_0$ of image data 305, filter 310 would be two rows off the top of upper horizontal boundary 306. As a result, x would be −2. For line 0 of the line buffers, i.e., k=0, the following coefficient values are obtained: c(k−x)+c(−x−1−k)=c(0−(−2))+c(−(−2)−1−0), which is c(2)+c(1). Since for c(2), n is greater than 0 and less than N, c(2) is equal to $c_2$. Similarly, since for c(1), n is greater than 0 and less than N, c(1) is also equal to $c_1$. Therefore, the data in line 0 of the line buffers is multiplied by $c_2$ and $c_1$. For line 1 of the line buffers, i.e., k=1, the following coefficient values are obtained: c(k−x)+c(−x−1−k)=c(1−(−2))+c(−(−2)−1−1), which is c(3)+c(0). Since for c(3), n is greater than 0 and less than N, c(3) is equal to $c_3$. Similarly, since for c(0), n is equal to 0, c(0) is also equal to $c_0$. Therefore, the data in line 1 of the line buffers is multiplied by $c_3$ and $c_0$. For line 2 of the line buffers, i.e., k=2, the following coefficient values are obtained: c(k−x)+c(−x−1−k)=c(2−(−2))+c(−(−2)−1−2), which is c(4)+c(−1). Since for c(4), n is greater than 0 and less than N, c(4) is equal to $c_4$. Since for c(−1), n is less than 0, c(−1) is equal to 0. Therefore, the data in line 2 of the line buffers is multiplied by $c_4$. For line 3 of the line buffers, i.e., k=3, the following coefficient values are obtained: c(k−x)+c(−x−1−k)=c(3−(−2))+c(−(−2)−1−3), which is c(5)+c(−2). Since for c(5), n is equal to N, c(5) is equal to 0. Since for c(−2), n is less than 0, c(−2) is also equal to 0. Therefore, the data in line 3 of the line buffers is multiplied by 0. For line 4 of the line buffers, i.e., k=4, the following coefficient values are obtained: c(k−x)+c(−x−1−k)=c(4−(−2))+c(−(−2)−1−4), which is c(6)+c(−3). Since for c(6), n is greater than N, c(6) is equal to 0. Since for c(−3), n is less than 0, c(−3) is also equal to 0. Therefore, the data in line 4 of the line buffers is multiplied by 0. Thus, data in line buffer line 0 of the line buffers (i.e., data of row $j_0$ of image data 305) is multiplied by $c_2$ and $c_1$, data in line 1 of the line buffers (i.e., data of row $j_1$ of image data 305) is multiplied by $c_3$ and $c_0$, and data in line 2 of the line buffers (i.e., data of row $j_2$ of image data 305) is multiplied by $c_4$.

In an alternative embodiment, instead of using the above method for managing the storage of image data in the line buffers and determining the application of filtering coefficients to the data in the line buffers, the following method may be used when the filter is off the upper horizontal boundary of the image data. As image data arrives for filtering, the image data is fed into the line buffers so as to commence filtering of data on the first row of the image data. For example, when using a 5-tap filter, such as filter 305, data from row $j_0$ of image data 310 is stored in both lines 1 and 2 of the line buffers, data from row $j_1$ is similarly stored in both lines 0 and 3 of the line buffers, and data from row $j_2$ is stored in line 4 of the line buffers. Thereafter, for filtering image data on row $j_0$, data from lines 0 to 4 of the line buffers are respectively multiplied by filtering coefficients $c_0$ to $c_4$. For filtering image data on row $j_1$, data from each of the line buffers is moved up by one line, i.e., data from line 4 is moved to line 3, data from line 3 is moved to line 2, and so on, and the bottom most line, line 4, is filled with data on the next row of image data 305 (i.e., data on row $j_3$). Thereafter, data from lines 0 to 4 of the line buffers are respectively multiplied by filtering coefficients $c_0$ to $c_4$. This process is repeated for filtering each successive row of image data until the filter crosses lower horizontal boundary 308 of image data 305. Once the filter is below lower horizontal boundary 308, then the data in the line buffers is maintained unchanged and the previously described method for determining which filtering coefficient(s) should be multiplied by data in each of the lines of the line buffers.

Figure 4:
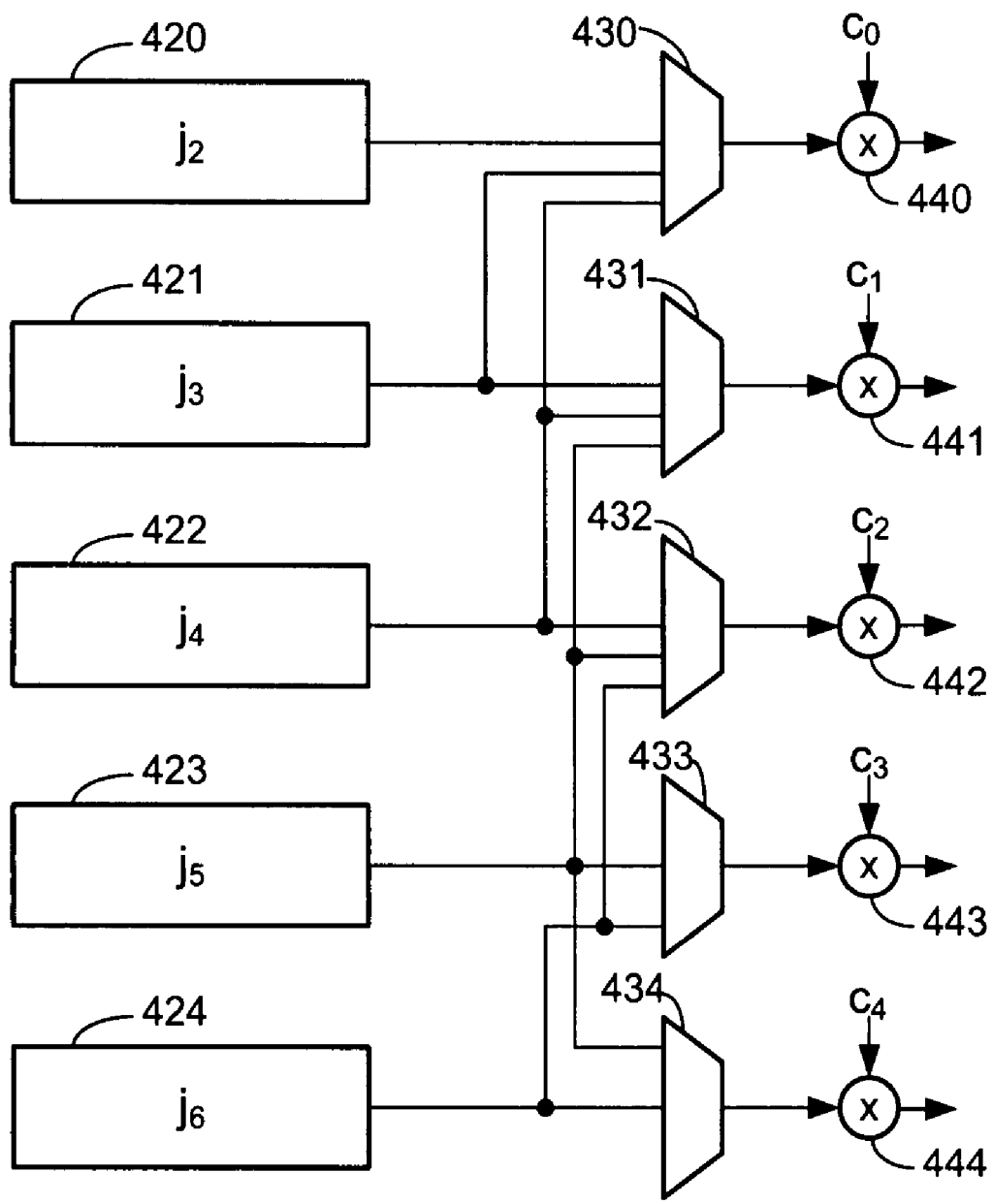
FIG. 4 illustrates yet another embodiment of the present invention.

FIG. 4 illustrates yet another embodiment of the present invention. In FIG. 4, 5 lines of lines buffers, lines buffers 420 to 424, are for storing image data as they are to be used with a 5 tap filter. When used in conjunction with filtering rows $j_4$ to $j_6$ of image data 305 of FIG. 3, line buffers 420 to 424 respectively store data from rows $j_2$ to $j_6$. This data remains unchanged when filtering data from rows $j_4$ to $j_6$ of image data 305. Data from line buffers 420 to 424 are fed into multiplexers 430 to 434 as shown. Each of multiplexers 430 to 434 outputs one of its inputs. The outputs of multiplexers 430 to 434 are respectively multiplied with filtering coefficients $c_0$ to $c_4$ using multipliers 440 to 444, respectively. The input selected by each of multiplexers 430 to 434 depends on which row of image data 310 is being filtered by filter 305. For example, when filtering data on row $j_4$, multiplexers 430 to 434 respectively output data from line buffers 420 to 424, which, as noted above, respectively store data from rows $j_2$ to $j_6$. When filtering data on row $j_5$, multiplexer 430 outputs data from line buffer 421 (i.e., data on row $j_3$), multiplexer 431 outputs data from line buffer 422 (i.e., data on row $j_4$), multiplexer 432 outputs data from line buffer 423 (i.e., data on row $j_5$), multiplexer 433 outputs data from line buffer 424 (i.e., data on row $j_6$), and multiplexer 434 outputs data from line buffer 424 (i.e., data on row $j_6$). When filtering data on row $j_6$, multiplexer 430 outputs data from line buffer 422 (i.e., data on row $j_4$), multiplexer 431 outputs data from line buffer 423 (i.e., data on row $j_5$), multiplexer 432 outputs data from line buffer 424 (i.e., data on row $j_6$), multiplexer 433 outputs data from line buffer 424 (i.e., data on row $j_6$), and multiplexer 434 outputs data from line buffer 423 (i.e., data on row $j_5$).

It is to be noted that the embodiment of FIG. 4 may be modified so as to be used for filtering data in the first three rows of image data 305, i.e., rows $j_0$ to $j_2$. In such a case, line buffers 420 to 424 would store data from rows $j_0$ to $j_4$ of image data. Moreover, connections between line buffers 420 to 424 and multiplexers 430 to 434 would be modified such that the outputs of multiplexers 430 to 434 would multiplied by the proper filtering coefficients. One way to accomplish this is to feed data from all line buffers 420 to 424 to all multiplexers 430 to 434. Another way to accomplish this is to provide each multiplexer with inputs from only the line buffers which might be sources of the image data to be multiplied by the filtering coefficient with which the output of the multiplexer is to be multiplied. This allows for using smaller multiplexers.

Below is a description of yet another alternative embodiment for filtering the bottom set of rows of an image, e.g., rows $j_4$ to $j_6$ in image data 305. In such an embodiment, for filtering data in row $j_4$, data from rows $j_2$ to $j_6$ are initially stored in five line buffers, line buffers 0 to 4. The output of line buffers 0 to 4 are respectively multiplied by filtering coefficients $c_0$ to $c_4$. Thereafter, data from line buffers 0 to 4 are provided to multiplexers 0 to 4, where multiplexers 0 to 4 respectively provide their output back to line buffers 0 to 4. In one embodiment, all line buffers 0 to 4 provide inputs to all multiplexers 0 to 4. In another embodiment, inputs from the minimum number of line buffers are provided to each multiplexer while ensuring that each multiplexer receives the necessary inputs for processing all rows $j_4$ to $j_6$. This allows for using smaller multiplexers.

Figure 5:
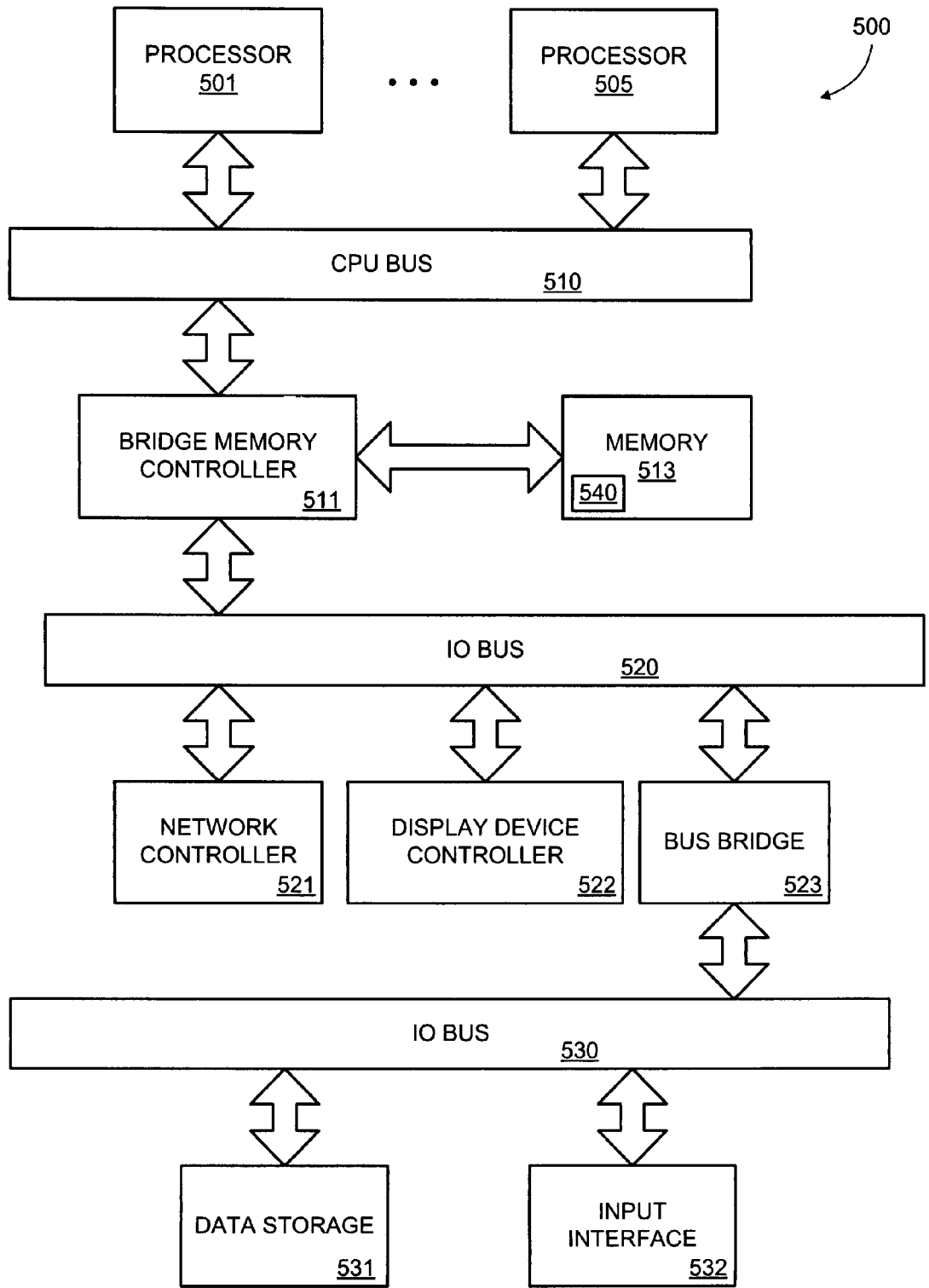
FIG. 5 is a block diagram of an exemplary computer system in which an exemplary embodiment of the present invention resides.

FIG. 5 is a block diagram of an exemplary computer system 500 in which an exemplary embodiment of the present invention resides. Computer system 500 includes one or more processors that process data signals. As shown, computer system 500 includes first processor 501 and yth processor 505, where y may be any positive integer. Processors 501 and 505 may be a complex instruction set computer microprocessor, a reduced instruction set computing microprocessor, a very long instruction word microprocessor, a processor implementing a combination of instruction sets, a digital signal processor (DSP) or other processor device. Processors 501 and 505 may be multi-core processors with multiple processor cores on each chip. Each of processors 501 and 505 and each of the processor cores may support one or more hardware threads. Processors 501 and 505 are coupled to central processing unit (CPU) bus 510 that transmits data signals between processors 501 and 505 and other components in computer system 500.

Computer system 500 includes memory 513. Memory 513 may be a dynamic random access memory (DRAM) device, a static random access memory (SRAM) device, and/or other memory device. Memory 513 may store instructions and code represented by data signals that may be executed by processor 501. A cache memory (not shown) may reside inside processor 501 that stores data signals stored in memory 513. The cache speeds access to memory by processor 501 by taking advantage of its locality of access. In an alternate embodiment of computer system 500, the cache resides external to processor 501. Bridge memory controller 511 is coupled to CPU bus 510 and memory 513. Bridge memory controller 511 directs data signals between processor 501, memory 513, and other components in computer system 500 and bridges the data signals between CPU bus 510, memory 513, and first IO bus 520.

First IO bus 520 may be a single bus or a combination of multiple buses. First IO bus 520 provides communication links between components in computer system 500. Network controller 521 is coupled to first IO bus 520. Network controller 521 may link computer system 500 to a network of computers (not shown) and supports communication among the machines. Display device controller 522 is coupled to first IO bus 520. Display device controller 522 allows coupling of a display device (not shown) to computer system 500 and acts as an interface between the display device and computer system 500.

Second IO bus 530 may be a single bus or a combination of multiple buses. Second IO bus 530 provides communication links between components in computer system 500. Data storage device 531 is coupled to second IO bus 530. Data storage device 531 may be a hard disk drive, a floppy disk drive, a CD-ROM device, a flash memory device or other mass storage device. Input interface 532 is coupled to second IO bus 530. Input interface 532 may be, for example, a keyboard and/or mouse controller or other input interface. Input interface 532 may be a dedicated device or can reside in another device such as a bus controller or other controller. Input interface 532 allows coupling of an input device to computer system 500 and transmits data signals from an input device to computer system 500. Bus bridge 523 couples first IO bus 520 to second IO bus 530. Bus bridge 523 operates to buffer and bridge data signals between first IO bus 520 and second IO bus 530. It should be appreciated that computer systems having a different architecture may also be used to implement computer system 500.

Instructions 540 for executing methods of the present invention may reside in memory 513 and be executed by one or more of processors 501 and 505.

Embodiments of the present invention may be provided as a computer program product or software. In one embodiment, embodiments of the present invention may be provided as a machine-accessible or machine-readable medium (e.g., an electronically machine-accessible or machine-readable medium) having instructions. In one embodiment, embodiments of the present invention may be provided as an article of manufacture that includes a machine-accessible or machine-readable medium having instructions. The instructions on the machine-accessible or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine-accessible medium" or "machine-readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of image filtering, the method comprising:
   storing in line buffers image data corresponding to a plurality of rows of an image;
   filtering image data on one row of the plurality of rows; and
   filtering image data on another row of the plurality of rows without changing the image data stored in the line buffers between filtering image data on the one row and filtering image data on the another row,
   wherein the filtering image data on the one row and the filtering image data on the another row are performed by one or more processors.

2. The method of claim 1 further comprising:
   determining, for filtering image data on the one row, which row or rows of filtering coefficients in a filter apply to each row of image data stored in the line buffers; and
   determining, for filtering image data on the another row, which row or rows of filtering coefficients in the filter apply to each row of image data stored in the line buffers.

3. The method of claim 2 further comprising:
defining filtering coefficients of the filter, wherein a filtering coefficient c(n) is a filtering coefficient for row n of the filter, where n is an integer that represents a row number of the filter, wherein when row numbers of the filter are numbered 0 to N−1, c(n) is equal to 0 when n is less than 0 or when n is equal to or greater than N, where N is an integer representing total number of rows in the filter; and
determining, for each line k of the line buffers, which filtering coefficient or coefficients apply, wherein k is an integer that represents a line number for lines in the line buffers, wherein when line numbers of the line buffers are numbered from 0 to N−1, k is equal to or greater than 0 and less than N.

4. The method of claim 3, wherein the line buffers include N lines, where each line is for storing a row of image data.

5. The method of claim 3, wherein the filter is x rows below the image, where x is a positive integer, and for each line k of the line buffers, filtering coefficients c(k−x)+c(2N−x−1−k) apply, wherein lines 0 to N−1 of line buffers respectively store data of rows M−N to M−1 of the image, where M is an integer that represents the number of rows of data in the image.

6. The method of claim 3, wherein the filter is −x rows above the image, where x is a negative integer, and for each line k of the line buffers, filtering coefficients c(k−x)+c(−x−1−k) apply, wherein line buffers 0 to N−1 respectively store data from rows 0 to N−1 of the image.

7. The method of claim 3, wherein the determining, for each line k of the line buffers, which filtering coefficient or coefficients apply is performed during horizontal blanking.

8. A method of image filtering, the method comprising:
storing in line buffers image data corresponding to a plurality of rows of an image, wherein the line buffers include N lines, where N is an integer and each line of the line buffers stores a row of image data from the image, wherein lines 0 to N−1 of the line buffers respectively store data of rows M−N to M−1 of the image data, where M is an integer that represents the number of rows of data in the image data;
defining filtering coefficients of a filter, wherein a filtering coefficient c(n) is a filtering coefficient for row n of the filter, where n is an integer that represents a row number of the filter, wherein when row numbers of the filter are numbered 0 to N−1, c(n) is equal to 0 when n is less than 0 or when n is equal to or greater than N; and
determining, for each line k of the line buffers, which filtering coefficient or coefficients apply, wherein k is an integer that represents a line number in the line buffers, further wherein when lines numbers of the line buffers are numbered from 0 to N−1, k is equal to or greater than 0 and less than N;
wherein for each line k of the line buffers, filtering coefficients c(k−x)+c(2N−x−1−k) apply, where x is a positive integer that indicates by how many rows the filter is below the image, and wherein the defining and the determining are performed by one or more processors.

9. The method of claim 8, wherein the determining, for each line k of the line buffers, which filtering coefficient or coefficients apply is performed during horizontal blanking.

10. A non-transitory computer-readable medium including sequences of instructions, the sequences of instructions including instructions which when executed cause a computer to perform:
storing in line buffers image data corresponding to a plurality of rows of an image;
filtering image data on one row of the plurality of rows; and
filtering image data on another row of the plurality of rows without changing the image data stored in the line buffers between filtering image data on the one row and filtering image data on the another row.

11. The non-transitory computer-readable medium of claim 10 further comprising instructions to perform:
determining, for filtering image data on the one row, which row or rows of filtering coefficients in a filter apply to each row of image data stored in the line buffers; and
determining, for filtering image data on the another row, which row or rows of filtering coefficients in the filter apply to each row of image data stored in the line buffers.

12. The non-transitory computer-readable medium of claim 11 further comprising instructions to perform:
defining filtering coefficients of the filter, wherein a filtering coefficient c(n) is a filtering coefficient for row n of the filter, where n is an integer that represents a row number of the filter, wherein when row numbers of the filter are numbered 0 to N−1, c(n) is equal to 0 when n is less than 0 or when n is equal to or greater than N, where N is an integer representing total number of rows in the filter; and
determining, for each line k of the line buffers, which filtering coefficient or coefficients apply, wherein k is an integer that represents a line number for lines in the line buffers, wherein when line numbers of the line buffers are numbered from 0 to N−1, k is equal to or greater than 0 and less than N.

13. The non-transitory computer-readable medium of claim 12, wherein the line buffers include N lines, where each line is for storing a row of image data.

14. The non-transitory computer-readable medium of claim 12, wherein the filter is x rows below the image, where x is a positive integer, and for each line k of the line buffers, filtering coefficients c(k−x)+c(2N−x−1−k) apply, wherein lines 0 to N−1 of line buffers respectively store data of rows M−N to M−1 of the image, where M is an integer that represents the number of rows of data in the image.

15. The non-transitory computer-readable medium of claim 12, wherein the filter is −x rows above the image, where x is a negative integer, and for each line k of the line buffers, filtering coefficients c(k−x)+c(−x−1−k) apply, wherein line buffers 0 to N−1 respectively store data from rows 0 to N−1 of the image.

16. The non-transitory computer-readable medium of claim 12, wherein the determining, for each line k of the line buffers, which filtering coefficient or coefficients apply is performed during horizontal blanking.

17. An article of manufacture including the non-transitory computer-readable medium of claim 10.

* * * * *